United States Patent [19]

Reed et al.

[11] 4,206,802
[45] Jun. 10, 1980

[54] MOISTURE SEPARATOR REHEATER WITH THERMODYNAMICALLY ENHANCED MEANS FOR SUBSTANTIALLY ELIMINATING CONDENSATE SUBCOOLING

[75] Inventors: William G. Reed, Portland; Jack S. Mazer, South Portland; Russell L. Shade, Jr., Cape Elizabeth, all of Me.

[73] Assignee: General Electric Company, Schenectady, N.Y.

[21] Appl. No.: 890,674

[22] Filed: Mar. 27, 1978

[51] Int. Cl.² .................. F28B 9/02; F22G 1/00; F28F 9/22; F28D 7/06
[52] U.S. Cl. .................................. 165/1; 122/483; 165/108; 165/113; 165/145; 165/174; 165/176
[58] Field of Search .............. 122/483; 165/108, 113, 165/111, 145, 176, 1

[56] References Cited

U.S. PATENT DOCUMENTS

| | | | |
|---|---|---|---|
| 3,073,575 | 1/1963 | Schulenberg | 165/174 |
| 3,667,430 | 6/1972 | Hubble et al. | 122/483 |
| 3,712,272 | 1/1973 | Carnavos et al. | 122/483 |
| 3,830,293 | 8/1974 | Bell | 165/108 |
| 3,996,897 | 12/1976 | Herzog | 122/483 |

FOREIGN PATENT DOCUMENTS

2247691  6/1975  France .................................. 122/483

OTHER PUBLICATIONS

Jet Compressors, Bulletin 4F, Amtek-Schutte & Koerting Division.

Primary Examiner—Sheldon Richter
Attorney, Agent, or Firm—John F. Ahern; James W. Mitchell; Ormand R. Austin

[57] ABSTRACT

A Moisture Separator Reheater (MSR) has a plurality of tube bundles which receive high-pressure saturated (tubeside) steam therein. Steam to be reheated (shellside steam) is passed in heat-exchange relationship with the tubes of the first and second reheater tube bundles after first being dried by the panels of a moisture separator. It emerges from the shell of the reheater dried and heated. In the reheater tube bundles saturated steam at temperatures and pressures substantially higher than the shellside steam transfers heat to the shellside steam by condensation within the tubes. The steam in the second stage tube bundle is at a temperature and pressure that is substantially higher than that of the steam in the first stage tube bundle and is heating shellside steam at a higher temperature than the shellside inlet steam to the first stage tube bundle. A greater quantity of tubeside steam than is theoretically necessary is passed through the tube bundles. This excess steam causes scavenging of the tube bundle to substantially eliminate condensate subcooling and related instabilities. Scavenging steam is provided to the first stage tube bundle with essentially no thermodynamic loss by passing the exhausted scavenging steam from the second stage tube bundle through a high differential pressure (ΔP) thermocompressor where it is isentropically expanded. It then entrains a higher rate of exhausted scavenging steam from the first stage tube bundle. The mixed discharge from the thermocompressor is then fed to the inlet of the first stage tube bundle, resulting in a high rate of scavenging steam therein. Minimal thermodynamic loss is achieved since the first stage scavenging steam is reused to continually scavenge the first stage tube bundle, rather than being exhausted to a lower energy point in the system, as is conventionally done, as for example to a feedwater heater.

15 Claims, 4 Drawing Figures

MOISTURE SEPARATOR REHEATER WITH THERMODYNAMICALLY ENHANCED MEANS FOR SUBSTANTIALLY ELIMINATING CONDENSATE SUBCOOLING

The present invention relates generally to the field of heat exchangers, and, more particularly, to such heat exchangers used with steam turbines to provide dried, reheated high-temperature steam for producing work in low-pressure turbine stages. Such heat exchangers are embodied in moisture separator reheaters (MSR's).

BACKGROUND OF THE INVENTION

Steam derived from a fossil-fueled boiler is generally hot and dry and contains sufficient energy to operate the high-pressure turbine. Thereafter it is generally reheated in the boiler so that sufficient useful work may be performed thereby, first in intermediate and then in low-pressure stages. Steam from a nuclear steam generator or reactor, on the other hand, is generally of relatively low temperature and is saturated. After passing through a high-pressure turbine stage the nuclear steam contains sufficient entrained moisture that it must be demoisturized, and preferably reheated thereby increasing its enthalpy in order that it reliably perform further useful work.

A separate heat exchanger, a Moisture Separator Reheater (MSR), is used for this purpose. In an MSR, moisture entrained in the once-used, or shellside, steam is first removed by passage of the steam through panels of a moisture separator containing a series of channels between angular plates with large surface area for removing entrained moisture. The then-dried steam containing about 0.5% moisture is passed in heat-exchange relationship with one or more tube bundles generally of re-entrant or U-shaped configuration, which contain steam taken from the turbine inlet or from an extraction port in the high-pressure turbine (tubeside steam), are reheated to a temperature at which it may pass to the low-pressure turbine to reliably do useful work.

The design objective of the reheater tube bundles is to raise the temperature of the shellside steam to as near a value of the tubeside steam as possible. As a practical matter, sufficient heat transfer surface is provided so that it is raised to within approximately 25° F. of that value.

Ideally one would seek to supply sufficient steam to each tube in the tube bundles so that, after heat exchange with the shell-side steam via condensation, the tubeside steam is completely condensed at the tube exit. In practice, some tubes are supplied with excess steam and others are supplied with insufficient steam which leads to condensate subcooling and possible instabilities.

Accordingly, it is an object of the invention to provide a moisture separator reheater construction which substantially eliminates the existence of subcooled condensate in the reheater tubes thereof.

Another object of the invention is to provide improved moisture separator reheater structure which includes improved scavenging of the reheater tube bundles thereof.

Yet another object of the invention is to provide moisture separator reheater structure, and method of operating thereof, which substantially eliminates subcooling of condensate in the tube bundles thereof with little or no loss in thermodynamic efficiency thereof.

DESCRIPTION OF A PREFERRED EMBODIMENT OF THE INVENTION

Briefly stated, in accord with a preferred embodiment of this invention, a moisture separator reheater has a plurality of tube bundles which receive high-pressure saturated steam therein. Steam to be reheated (shellside steam) is passed progressively into heat-exchange relationship with the tubes of the first and second stage reheater tube bundles after first being dried by the moisture separator which generally removes all but about 0.5% of the incoming moisture therein. Shellside steam emerges from the shell of the reheater dried and reheated to a value of approximately 130° F. superheat for example, above its temperature before reheat, at full power. In the first U tube bundle steam at a temperature and pressure substantially higher than that which is to be reheated on the shellside, exchanges heat to the colder shellside steam by in-tube condensation. In the second U tube bundle steam at a temperature and pressure substantially higher than that in the first U tube bundle exchanges heat to the shellside steam by the same process.

To minimize condensate subcooling in the tubes of the tube bundles, the flow resistance of the tubes may be modified to cause greater flow of tubeside steam through those tubes which experience the highest heat transfer duty. Additionally a greater quantity of tubeside steam than is theoretically necessary considering the bundle heat load is passed through the tube bundles. This excess steam causes a scavenging of the tube bundle to minimize subcooling and related instabilities. Scavenging steam in the first tube bundle is provided with little or no thermodynamic loss by passing exhausted scavenging steam from the second tube bundle through a thermocompressor where it is isentropically expanded and entrains a higher flow rate than itself of exhausted scavenging steam from the first stage tube bundle. The mixed discharge steam from the thermocompressor is then fed into the inlet of the first stage tube bundle, resulting in a high rate of first stage scavenging steam being recirculated.

The novel features believed characteristic of the invention are set forth in the appended claims. The invention itself, together with further objects and advantages thereof, is more particularly described in the following detailed description taken in conjunction with the accompanying drawings in which:

Figure 1:
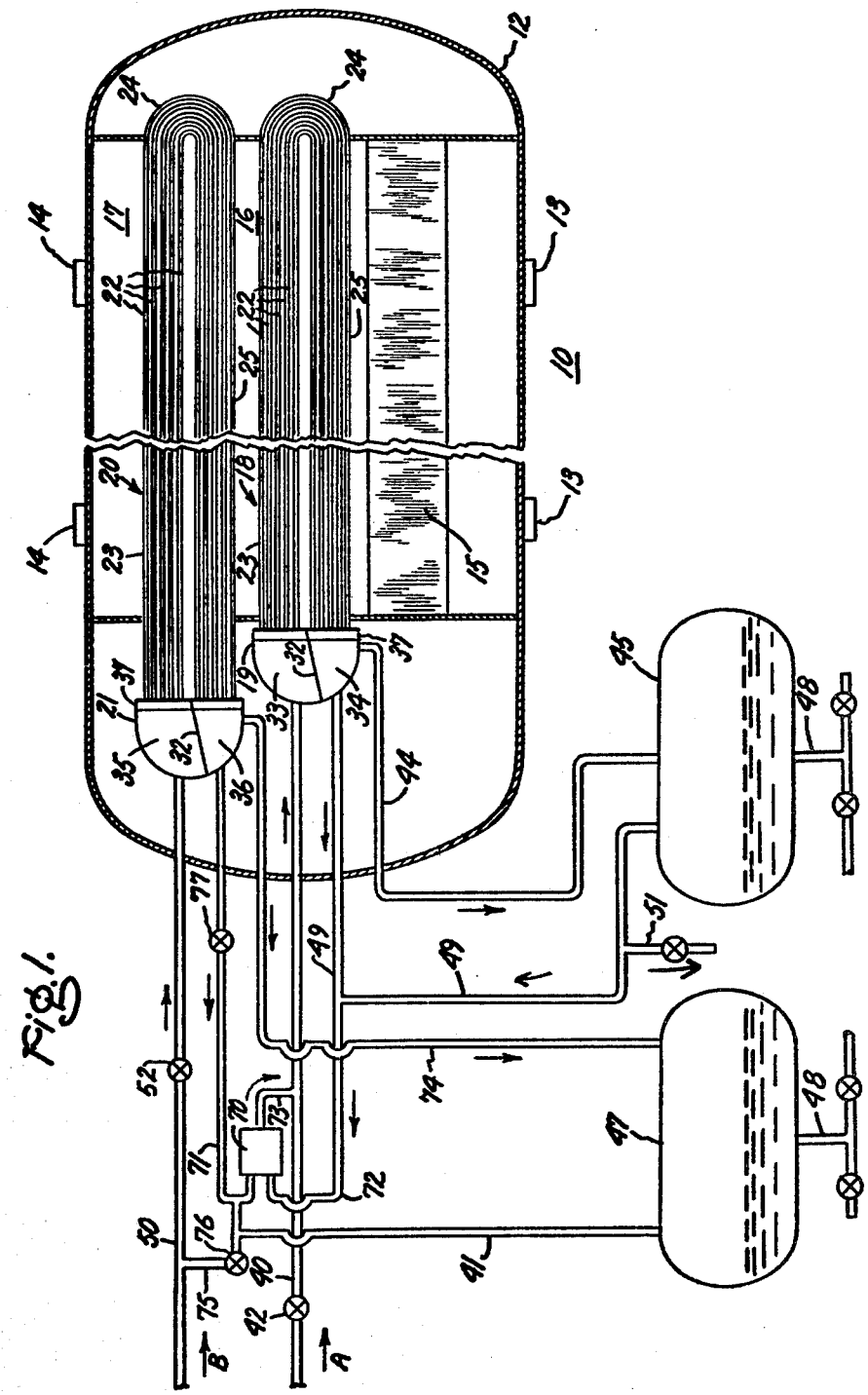
FIG. 1 is a partially schematic vertical cross-sectional view of a moisture separator-reheater and associated accessories constructed in accord with a preferred embodiment of the present invention.

In FIG. 1 a moisture separator reheater, represented generally at 10, includes a pressure vessel 12 typically containing a plurality of steam inlets 13 and a plurality of steam outlets 14 to facilitate the passage of steam therethrough in order that it be dried and reheated. Typically such heating at full power may be from a saturated temperature of about 350°–375° F. to a superheated temperature of about 500° F.

Moisture separator panels 15 which are well known to the art and which may, for example, be similar to that disclosed in U.S. Pat. No. 3,667,430—Hubble et al, are disposed over inlets 13 and inlet plenums (not shown) and function to remove substantially all entrained moisture from the incident steam. The moisture separator panels have a very large surface area with so-called "wiggle plates" and have a drain system therefor (not shown) which collects the moisture drained from the panels and provides a path for removal of the moisture from shell 12.

A plurality of reheaters 16 and 17 are located immediately above moisture separator panels 15 and are within the path traversed by steam as it passes from inlets 13 to outlets 14.

First stage reheater 16 includes tube bundle 18 and header 19. Second stage reheater 17 includes tube bundle 20 and header 21. During such traversal the shellside steam passes in heat-transfer relationship across a plurality of U tubes 22, each of which carries within it high-pressure, saturated steam, the sources of which will be described hereinafter. Each U tube 22 comprising the respective tube bundles 18 and 20 includes a nearly horizontal section 23, a rounded vertically oriented U-bend section 24, and a nearly horizontal outlet section 25. Each of headers 19 and 21 contains a pass-partition plate 32 which separates the respective headers and into upper inlet chambers 33 and 35 and lower exchaust chambers 34 and 36. Each tube of tube bundles 18 and 20 has an inlet end in communication with the upper inlet chamber of its associated header, and the other end thereof is in communication with the lower, outlet, chamber of the same header. The inlet and outlet ends of the U tubes are individually rolled and welded into tubesheets 37, which are integral structural members of each of the respective headers 19, 21. Due to the parallel paths of all of the U tubes in a given tube bundle array all of such tubes are constrained to the same pressure difference (driving force) from inlet to outlet header section.

Operationally, high-pressure, saturated steam enters first stage reheater 16 through pipe 40, including source valve 42, and enters into inlet chamber 33 of header 19. This steam passes through U tubes 22, thus undergoing two longitudinal passes along the length of and parallel to the longitudinal axis of shell 12 and exercises a curved downward excursion as it reaches the end of the first horizontal excursion and returns to exhaust chamber 34 of header 19. During passage through U tubes 22 a certain proportion of the steam contained therein becomes condensed as it passes with the uncondensed steam to the outlet header section where it is discharged through drain pipe 44 to drain tank 45 exterior of shell 12. The liquid phase in tank 45 is generally drained to a feedwater heater or to the main condenser through line 48. A drain vent line 49 is provided to equalize pressure in the outlet header section and drain tank 45. From drain vent line 49 a pipe 72 is provided for passage of the first stage exhausted scavenging steam to the thermocompressor 70. A pipe 51 is also provided from drain vent 49 for continuous purging of non-condensable gases from the system.

The high-pressure saturated steam indicated by arrow A, which enters through heating steam inlet pipe 40 including a source of saturated steam and inlet valve 42, is generally taken from an extraction port in the high-pressure steam turbine with which it is associated and, hence will have a pressure substantially higher than the high-pressure turbine exhaust, but substantially less than main steam pressure. In a typical large steam turbine such saturated steam may have a pressure of approximately 500 psia at full power.

The saturated steam entering reheater 17 through heating steam inlet pipe 50 including a source valve 52, and identified as B, is normally taken from the inlet to the high-pressure turbine and is at main steam pressure. Typically this may be saturated at approximately 1000 psia, but is throttled at part load at 52 before entering tube bundle 17.

As the shellside steam entering shell 12 passes from inlet 13 across the tubes 22 of the tube bundles 18 and 20, and becomes progressively reheated, the temperature differential between the tubeside steam and the shellside steam decreases until the differential between the tubeside steam in the uppermost tube and the steam being reheated is approximately 25° F. at full power.

One significant problem to which this invention is most specifically directed results from the changing temperature differential between the shellside steam and the tubeside steam as the shellside steam is reheated. This temperature differential may typically decrease from approximately 100° F. to approximately 25° F. across a given tube bundle at full power. Additionally the shellside steam may contain some residual moisture carried through from moisture separator panels 15 which must be evaporated by heat transfer from the lower rows of tubes of the first stage tube bundle 18, before reheating of the steam may begin. Obviously with the greatest temperature differential between tubeside and shellside steam and the added evaporative duty the tendency is for the greatest heat transfer rate to occur in lower tubes of tube bundle 18 which in turn require that a greater quantity of tubeside steam be provided to the outer U tubes in vertically oriented first stage reheater tube bundles.

With the inlet ends of all U tubes in communication with the inlet section 33 of the header and the outlet ends of all U tubes in communication with the outlet section 34 of the header 19, all U tubes are constrained to the same pressure difference. As a result, the outer (vertical) U tubes are not supplied with sufficient steam to satisfy the heat transfer demand. The steam in these U tubes is thus completely condensed before tube end, and condensate subcooling results downstream of the point of complete condensation in satisfying the heat transfer demand. On the other hand, the inner (vertical) U tubes which pass more steam than is theoretically required, discharge a two-phase saturated mixture into outlet section 34 of header 19. Concerning the U tubes in which condensate subcooling occurs, one of many phenomena may occur.

If the mass flow rate in these tubes is sufficiently high so that tubes drain in full liquid flow, the flow will generally be steady, but overall performance will be degraded due to the reduction in tubeside temperature. If the mass flow rate in these tubes is not sufficiently high enough for the tubes to drain in full liquid flow, steam in the outlet section of the header (from the inner (vertical) U tubes) tends to be drawn into the tubes from the outlet end in order to satisfy the heat transfer demand. This countercurrent flow is generally unsteady with the formation of plugs of subcooled liquid which can oscillate in the tubes. As these plugs are periodically discharged from the tubes, an alternating thermal stress is realized at the tube to tubesheet welds. Thus, in this situation, not only is performance degraded due to the reduction in tubeside temperature, but also the cycling in tubeside temperature resulting from the periodic formation and discharge of subcooled plugs of liquid affords the potential for cyclic fatigue failures.

A further complication is also possible. If the total mass flow rate of subcooled liquid in a bundle is sufficiently high, and its weighted average degree of subcooling sufficiently high, sufficient saturated vapor in the outlet section of the header may be condensed in maintaining thermal equilibrium in the header so that the pressure in the outlet section of the header is reduced. This pressure reduction resulting from condensation in the outlet section of the header will not only tend to draw more subcooled liquid from the bundle, but also synchronize temperature oscillations in the tubes. This self-sustaining oscillation may cyclicly affect the total flow rate to the bundle, degrading sensitivity of conventional tube leak detection methods, as well as aggravating other tube bundle structural considerations, and generally disrupting normal plant operation.

Such problems are well known in the reheater arts. It is further well known that selective restriction of certain of the tubes to match tubeside flow rate with actual heat transfer duty can reduce subcooling. Such a solution for the reduction of subcooling and related instabilities in steam heat exchangers is shown by U.S. Pat. No. 3,073,575—Schulenberg. Thus, one may counteract much of the problem by a technique known as "orificing". Orificing at a reheater header is illustrated in detail in FIG. 2 of the drawing. The type of orificing shown is by restricting the tube entrance. Other orificing techniques are known in the art.

Thus for example the aforementioned U.S. Pat. No. 3,073,575 to Schulenberg teaches the use of an apertured plate having different sized apertures adjacent the entrance to different tubes of a heat exchanger to adjust the quantity of steam flowing into respective tubes. In yet another arrangement U.S. Pat. No. 3,830,293 to Bell teaches the use of partitions to divide the surface of a tube plate to provide flow restrictors to provide different quantities of steam to different regions of the tube plate and restricing steam flow at different rates for different groups of tubes.

Figure 2:
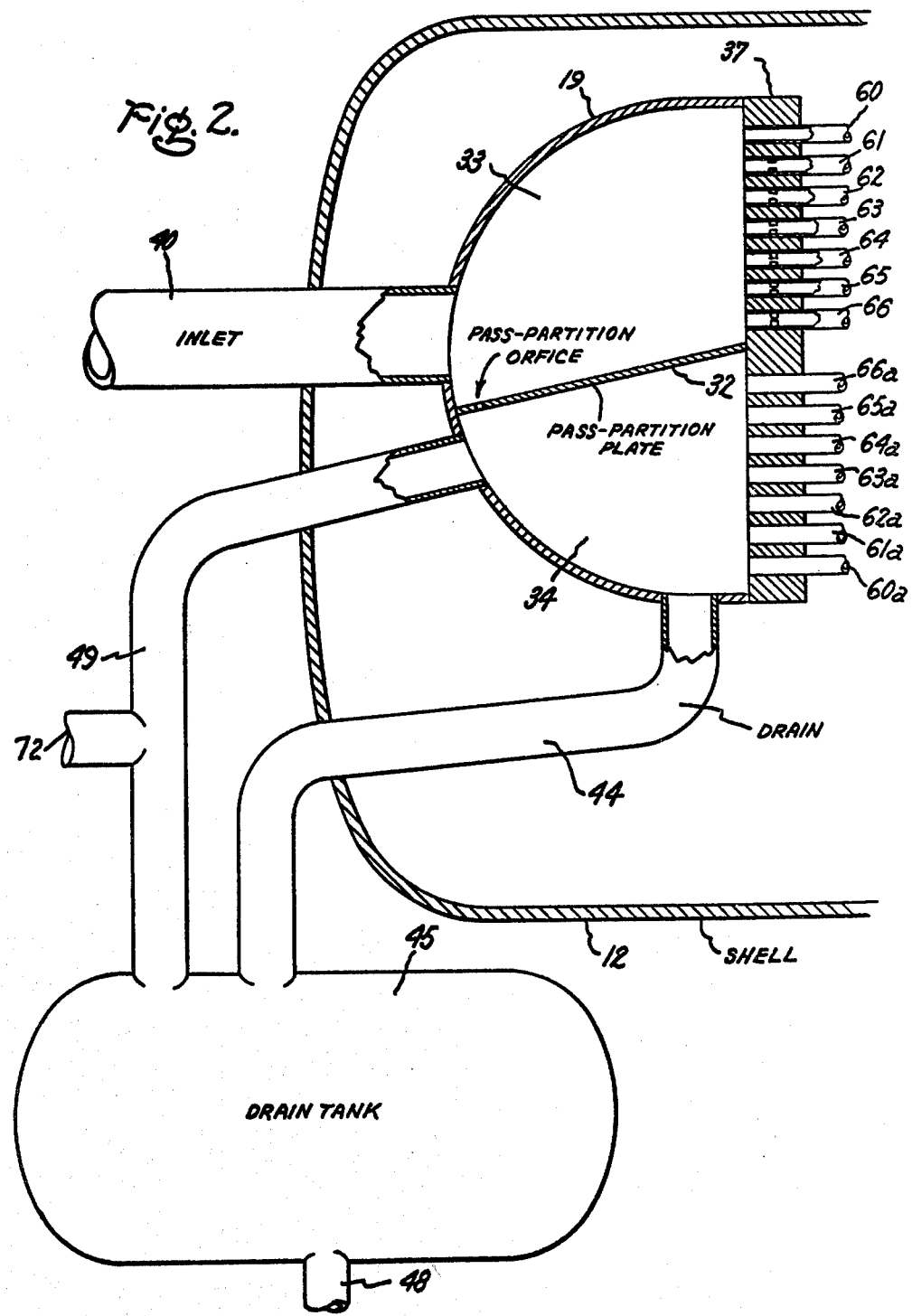
FIG. 2 is a partially schematic vertical cross-sectional view of a header and drain tank for a vertical U bend tube bundle as used in the apparatus of FIG. 1.

In FIG. 2 the header 19 and the adjacent portions of respective U tubes 60 through 66 at their interface with tubesheet 37 is illustrated in detail. As may be noted, saturated steam enters the input chamber 33 of header 19 through heating steam inlet pipe 40 and is distributed through tubes 60 through 66 and, after traversing longitudinally outward, vertically downward through the U bend sections, and longitudinal return paths, enters the exhaust chamber 34 of header 19 through pressure-tight passages through tubesheet 37. The inlet end of U tubes, 60 through 66, are orificed according to one possible scheme. As illustrated, tube 60 which, as it returns to the exhaust header on the return longitudinal pass, is in heat-transfer relationship with the coolest shellside steam. Additionally it must supply heat to evaporate any entrained moisture not removed from the shellside steam by the moisture separator panels. Thus tube 60 tends to have the greatest potential for condensate subcooling therein. Tube 61, as it returns from the same pass, has a lesser but still finite possibility of such occurrence. Tube 62 has an even lesser possibility. As the tube number increases to 66 the possibility of condensate subcooling in the return longitudinal pass to the exhaust chamber of header 19 becomes almost nonexistent. The orifice of tube 66 is therefore the most restricted so that less steam flows into this tube than any other not so restricted. Orificing, therefore, tends to counteract the situation caused by uneven condensation in different tubes 22 and may be arranged so that all tubes may pass the rate of steam required for the necessary reheating of shellside steam when operating at the duty level for which the orificing is specified.

In FIG. 2 it may be seen that it is not necessary to "orifice" the tubes 60A through 66A as they re-enter header 19, since they are the same tubes as tubes 60–66, having twice traversed the length of the shell 12 and are returning steam and condensate to exhaust (outlet) chamber 34. Liquid is drained through line 44 to drain tank 45.

Figure 3:
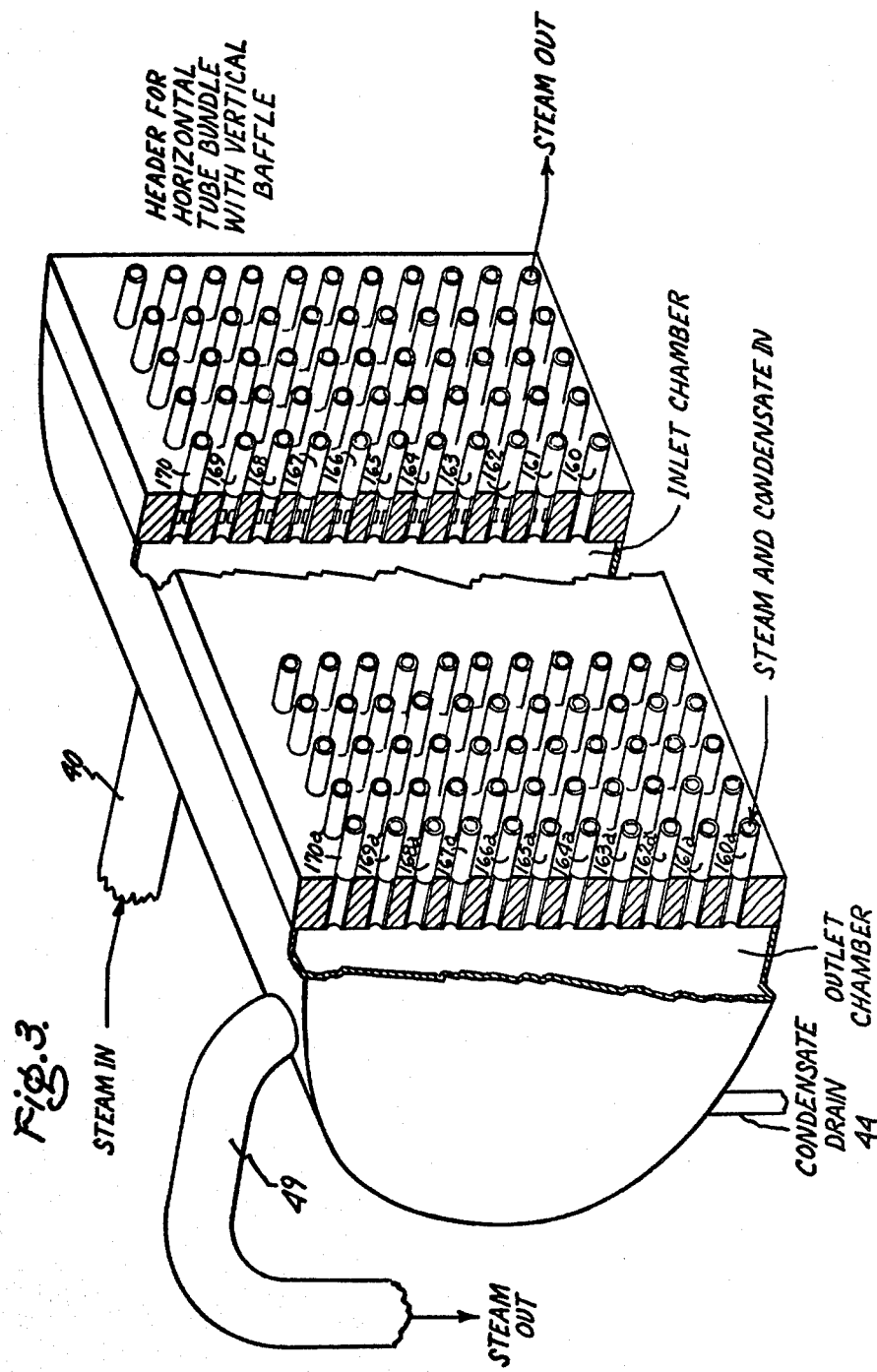
FIG. 3 is a partially schematic vertical perspective view of a header and drain tank for a horizontal U bend tube bundle as used in the apparatus of FIG. 1.

Orificing is particularly useful when the U tubes of the tube bundle are in a horizontal plane since in that instance the lowermost of the U tubes is exposed to the cooler shellside steam not only on the return pass but on both longitudinal passes through the shell 12 of the reheater. FIG. 3 illustrates how "orificing" is applied to the U tubes of a horizontal U tube bundle. In a horizontal reheater U tube bundle the header is separated into two chambers by a vertical baffle rather than by a substantially horizontal baffle 32 as shown in FIG. 1.

Details of a horizontal reheater tube bundle are shown in U.S. Pat. No. 3,712,272 issued to Carnavos and commonly assigned. A modified horizontal tube bundle is also shown and discussed in U.S. Pat. No. 3,996,897, issued to Herzog and commonly assigned, the disclosures of which are incorporated by reference herein to show the structure of a horizontal U tube bundle.

FIG. 3 shows orificing at a section of tubes along a vertical cross section taken in the inlet section of the header, and the lack of orificing along a vertical cross section taken in the exhaust section of the header.

As shown with respect to the vertical U tubes in FIG. 2, FIG. 3 shows the progressive constriction of the tubes 161–170 as the respective tubes are exposed to shellside steam that has a progressively decreasing temperature differential from the tubeside steam, while tube 160 which is exposed to the greatest temperature differential is not restricted at all. FIG. 3 shows that the return section of the respective U tubes are not normally constricted before entering the exhaust section of the header.

While orificing is one technique for overcoming the problem of differential condensation in U tubes of a reheater tube bundle and thereby substantially eliminating condensate subcooling, perhaps the simplest way, conceptually, to avoid this problem is to pass through each tube bundle a sufficient quantity of saturated steam in excess of that which is required theoretically to cause reheating and thereby scavenge all U tubes. This expedient, is however, normally not practicable from an efficiency point of view since it represents an unjustifiable waste of energy. More practical schemes include the use of additional header partitioning as is shown in the aforementioned Herzog U.S. Pat. No. 3,996,897. According to the invention disclosed and claimed therein inlet steam enters a partitioned inlet section of the header of a horizontally oriented tube bundle and passes through the lower half of the U tubes to a return section of the header where condensate formed in the initial two longitudinal passes through the U tubes is drained off. The saturated steam then re-enters the tubes of the tube bundle, entering the upper half of the tube bundle and returning to the opposite section of the header from which accumulated condensate is again drained. This arrangement comprises a "four pass" arrangement and decreases the tendency toward condensate flooding and resultant thermal cycling.

In yet another "four pass" arrangement disclosed in U.S. Pat. No. 3,759,319—Ritland, a separate manifold is contained within the reheater to recirculate once circulated saturated steam through certain U tubes of a reheater tube bundle.

Unfortunately, orificing and alternative measures as discussed above are not normally a complete answer for the problems of condensate subcooling and related instabilities in moisture separator reheaters. One reason for orificing not being a complete solution is that any given orificing arrangement, although calculated and implemented to distribute the steam flow in the respective tubes so as to satisfy the theoretical heat transfer demand for one given operating condition, is not ideal for all operating conditions. Orificing which is ideal for one set of conditions may not be suitable for a different set of conditions, e.g., as turbine loading is changed from one power level to another.

The invention described herein may be used together with orificing (or other equivalent techniques) or independently thereof, to improve the operation of reheaters in moisture separator reheaters utilized with steam turbine-generator apparatus to substantially eliminate condensate subcooling and related instabilities.

It is well known that steam lines may be purged to remove water impurities and the like therefrom by the passage of high-pressure gas or stream therethrough. Thus, it would be feasible to prevent subcooling of condensate within reheater tube bundles by increasing the flow of saturated steam to each tube bundle from its source of input steam by a predetermined amount in excess of that which is theoretically required for a given load to reheat shellside steam. If enough excess saturated steam were taken from the tube bundle source, even if orificing were not utilized, the subcooling of condensate could be substantially eliminated. On the other hand, it is essential that steam generated for use with a steam turbine must be carefully utilized and the maximum work extracted therefrom in the necessary functions of the steam turbine, as for example, reheating of steam in a moisture separator reheater, heating of feedwater prior to its entry to the steam generator or reactor, and the use of the final produce of a condenser as feedwater for the system. The indiscriminate use of high-pressure steam or steam at an elevated temperature and pressure which could otherwise be utilized in a more productive and efficient use of the heat imparted thereto for such scavenging can significantly detract from the efficiency of the entire system. Since steam turbines are normally used for periods of in excess of 30 and as often as high as 40 years, the wasting of a significant percentage of steam to accomplish an objective such as substantially eliminating subcooling of condensate in reheater tube bundles can prove exceptionally costly in the amount of unnecessary fuel required to be used in order to achieve such an objective over an extended period of years.

In accordance with the present invention, we use, as scavenging steam to substantially eliminate condensate subcooling in one of a plurality of reheater tube bundles, steam which is recirculated to the tube bundle inlet. Motive power is provided by the scavenging steam from a higher pressure reheater tube bundle. Recirculated scavenging steam performs useful work as opposed to being fed to a feedwater heater so that the net effect of out improvement in reheater operation is improved reliability of reheater operation without any serious detriment to the efficiency of operation of the entire system. In fact our use of exhausted tubeside steam is an improvement over prior practice which involved feeding a lesser quantity of scavenging steam than is effective to substantially eliminate condensate subcooling to a feedwater heater or similar low-pressure point in the turbine cycle.

As illustrated in FIG. 1, we utilize a high $\Delta P$ the thermocompressor 70 to circulate scavenging steam to the inlet chamber 33 of header 19 of first stage reheater 16 in order to provide sufficient excess high-pressure steam to the individual tubes 22 of the tube bundle 18 to substantially eliminate condensate subcooling even in those tubes which are subjected to the greatest temperature differential.

Figure 4:
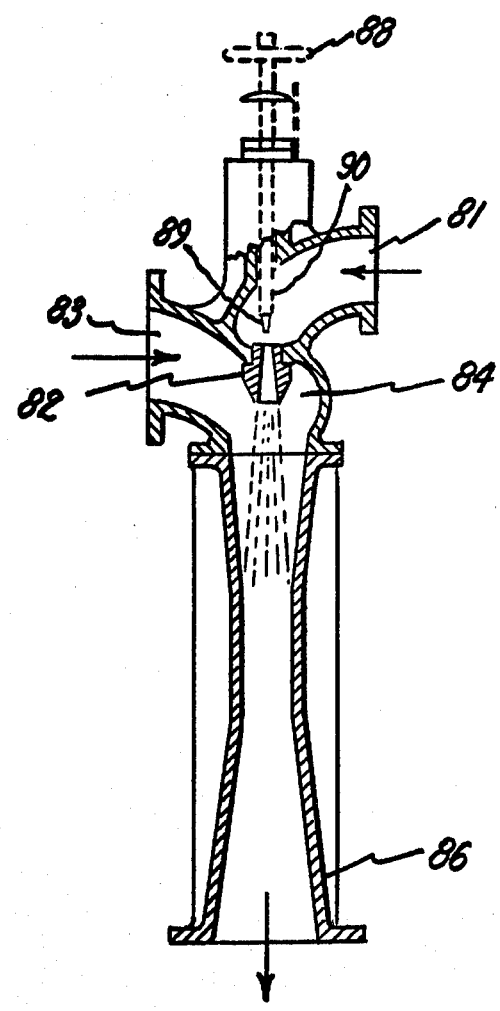
FIG. 4 is a vertical cross-sectional view of a thermocompressor illustrative of that which may be used in the apparatus of FIG. 1.

The motive fluid for thermocompressor 70 is provided through line 71 and is the scavenging steam available from exhaust chamber 36 of header 21 of second stage reheater 17. This steam has already performed its function of scavenging the second stage bundle and would normally be passed to a feedwater heater or to a similar lower pressure point in the system. This steam at a pressure of approximately 1000 psia at full loading, for example, powers thermocompressor 70 to provide scavenging steam for reheater 16. In general, the amount of steam used for this purpose is only approximately 2 to 10% of the theoretical amount of steam supplied to the inlet chamber of reheater 17, as is determined by the tube bundle 20 heat load. In the event the second stage tube bundles are not in service an alternate motive steam source can be provided as indicated by line 75 and valve 76. Valve 77 is then used to keep main steam from chamber 36. Thermocompressor 70, illustrated in detail in FIG. 4, is operated by high-pressure motive steam exhausted from header outlet chamber 36 of second stage reheater 17 to cause a greater quantity of suction steam than of motive steam to be drawn through line 72 from exhaust chamber 34 of header 19 of first stage reheater 16. The combined flow leaves thermocompressor 70 at a pressure of approximately 500 psia at full load (as an example) creating a desired high scavenging flow which is input to reheater 16.

In thermocompressor 70, with suction or low-pressure steam available from line 72 from exhaust chamber 34 of first reheater 16 and motive steam from line 71, the net result is a flow of steam through line 73 into line 40, which supplies extraction steam to inlet chamber 33 of header 19 of reheater 16, or which may be fed directly into inlet chamber 33.

Condensate which collects in header exhaust section 34 is drained through line 44 to drain tank 45. Liquid from tank 45 is passed to a feedwater heater or the main condenser by line 48. A drain vent line 49 is provided to ensure equalization of pressure in the exhaust section of header 19 and in drain tank 45.

To ensure that there is no accumulation of non-condensable gases within the system to interfere with the operation of reheater 16, a non-condensable gas purge is provided via line 51 to allow continuous low-flow purging to a lower pressure point in the system, e.g., to shell 12.

Drain condensate collected from the higher pressure reheater bundle 17 in outlet section 36 of header 21 is drained by line 74 to drain tank 47. A drain vent line 41 is provided to ensure equalization of pressure in the outlet section 36 of header 21 and drain tank 47. A lesser quantity of scavenging steam flow is required for tube bundle 17 due to the more balanced heat load distribution over the load range as stated hereinbefore. The scavenging flow in the tube bundle 17 is passed through line 71 and becomes the motive steam for thermocompressor 70.

The method and apparatus provided in accordance with our present invention of providing increased scavenging steam to substantially eliminate condensate subcooling and related instabilities is very economical and thermodynamically very efficient. Not only is the foregoing achieved, but the total efficiency of the system is improved because the amount of scavenging steam that is fed from reheater 16 to a lower point in the system is greatly reduced, thus minimizing a less efficient use of hot steam.

We have found that by the utilization of our invention to scavenge MSR tube bundles, the motive steam supplied to the high ΔP thermocompressor would readily entrain a greater quantity of suction steam having a ratio of 1.8:1 to the quantity of motive steam in the instance of an MSR having horizontally oriented U tubes in the tube bundles.

An even greater advantage in the quantity of suction steam which is entrained by motive steam in the thermocompressor is achieved in the instance of reheater tube bundles having vertically oriented U bend tubes with inherently lower pressure drop. In this instance the ratio of suction steam entrained by the motive steam may readily be as high as 6:1 according to data collected in developing our invention.

To cite typical sets of pressures and steam flow rates in reheaters of both horizontal and vertical U bend configurations, in accord with our invention, the following examples of data are presented by way of example without limitation.

For a horizontal U bend structure utilized in a two-stage MSR which may have two MSR vessels, saturated throttle steam at a pressure of about 960 psia is supplied to the inlet chamber of the second stage reheater at a mass flow rate of approximately 297,000 lbs./hr. After heating shellside steam, it exits from the tube bundle at a pressure of about 945 psia at a flow rate of roughly 270,000 lbs./hr. of condensate and 27,000 lbs./hr. of exhaust steam (10% scavenging).

Steam from the exhaust chamber of the second stage header is fed to a thermocompressor at a pressure of about 945 psia and a mass flow of about 27,000 lbs./hr. and serves as motive steam for the thermocompressor.

Steam from the exhaust chamber of the first header is drawn to the thermocompressor as "suction steam" at a pressure of about 485 psia and a mass flow of about 50,000 lbs./hr.

The motive steam in the thermocompressor passes through a nozzle and is accelerated by venturi action to a high velocity with a corresponding drop in static pressure by isentropic expansion. This creates a suction effect which draws the suction steam along with it and then passes through a diffuser where the discharge mixture pressure is raised to a desirable value for recirculation through the first stage tube bundle as scavenging steam. Typically, the output of the thermocompressor may be at a pressure of 525 psia and a mass flow of 77,000 lbs./hr. This flow is then combined with approximately 290,000 lbs./hr. of saturated extraction steam at 520 psia and the total of 367,000 lbs./hr. is input to the inlet chamber of the first stage header. After heating shellside steam by condensation it exits to the exhaust chamber of the first stage header at a pressure of about 485 psia with roughly 317,000 lbs./hr. of condensate and 50,000 lbs./hr. of exhaust steam (16% scavenging). This exhaust steam is then recirculated back to the thermocompressor as suction steam.

Due to the high differential pressure between motive steam and suction steam in the thermocompressor, there is no high degree of criticality which might cause the system to be rendered inoperative or unstable due to a slight variation of input steam pressure or flow rate, or the load placed upon the tube bundles by the reheat steam requirements.

Data for a two-stage MSR having tube bundles with vertically oriented U bends show an even greater increase in first stage tube bundle scavenging with the same inputs as in the previous examples. Thus for a typical two-stage reheater utilizing vertical U bend tube bundles in a four reheater vessel application, saturated steam supplied to the inlet header of the second stage tube bundle may be approximately 970 psia pressure producing a mass flow rate of approximately 198,000 lbs./hr. of tubeside steam. After passing through the second stage tube bundle the pressure is approximately 965 psia with a flow rate of approximately 180,000 lbs./hr. of condensate and 18,000 lbs./hr. of exhaust steam which yields 10% scavenging in the second stage.

This second stage exhausted steam at 965 psia and 18,000 lbs./hr. serves as motive steam for the thermocompressor. Suction steam is drawn from the outlet section of the first stage header at a pressure of approximately 405 psia and a mass flow rate of approximately 108,000 lbs./hr. The thermocompressor provides a flow of steam to scavenge the first stage tube bundle at a pressure of approximately 415 psia and a mass flow rate of approximately 126,000 lbs./hr. This is combined with saturated extraction steam provided for reheat purposes at a pressure of about 415 psia and a mass flow of 110,000 lbs./hr. to the inlet of the first stage tube bundle for a total first stage tube bundle steam input of approximately 236,000 lbs./hr. After reheating, the tube bundle outlet header section receives approximately 128,000 lbs./hr. flow of condensate at approximately 405 psia, and 108,000 lbs./hr. of exhaust steam, indicative of approximately 84% scavenging.

The high rates of scavenging we are able to obtain in the first stage tube bundles of two-stage vertical U bend reheaters due to our invention makes it possible to dispense with orificing and still substantially eliminate condensate subcooling in the first stage tube bundle.

An additional advantage of our invention is that the system is readily adaptable for the use of commercially available thermocompressors whose operating parameters are well understood.

We are aware that U.S. Pat. No. 3,830,293, issued Aug. 20, 1974 to Bell, discloses the concept of using a pump or a thermocompressor (also referred to as a venturi vapor compressor) to cause a recirculation of steam through a tube and shell heat exchanger tube bank in order to avoid flow stagnation in the tubes caused either by the buildup of non-condensable gases or steam recirculation from the outlet chamber of the tube bundle into the outlet leg of some of the tubes. The concern was that the heat transfer surface would be less effective, presumably because the stagnated tubes would contain subcooled condensate and therefore would not have the same temperature difference to permit the same rate of heat transfer.

The teachings of the Bell patent are limited to application with a single tube bundle where the motive steam for the thermocompressor is the inlet steam and the suction steam is drawn from the outlet chamber of the same tube bundle. The pressure drop between the motive steam and the suction steam is relatively low compared with the bundle inlet pressure. A thermocompressor working with a relatively low-pressure difference (hereinafter referred to as a low $\Delta P$ thermocompressor) between the motive steam and the suction steam is not very efficient. The suction steam which can be recirculated is therefore a very small fraction of the motive steam. A low $\Delta P$ thermocompressor is very sensitive to bundle pressure drop, the greater the pressure drop the less efficient the device becomes. Our invention, on the other hand, has a very large pressure difference between the motive steam and the suction steam because a separate source of high-pressure steam is used for the motive steam. In an MSR application the pressure difference would be approximately 500 psid. Under these conditions a high $\Delta P$ thermocompressor is very efficient and is able to cause a suction flow greater than the motive steam flow. As used herein a high $\Delta P$ thermocompressor is intended to refer to a thermocompressor adapted to operate with a ratio of motive steam pressure to suction steam pressure of at least 1.5:1.

In accomplishing our objective of substantially eliminating condensate subcooling and related instabilities, a greater quantity of scavenging steam is generally required than one could expect to recirculate with a low $\Delta P$ thermocompressor. On the other hand, a high $\Delta P$ thermocompressor in our invention can achieve these rates of recirculation flow. The high $\Delta P$ thermocompressor is also smaller and it is easy to increase the suction flow rate by adjusting upward the motive steam flow.

As a side benefit a high $\Delta P$ thermocompressor as used in our invention does not cause a reduction in inlet header pressure. A low $\Delta P$ thermocompressor does result in a lower header pressure because it represents a flow resistance in the inlet steam line. A lower header pressure causes a reduction in thermal efficiency because the steam temperature is reduced.

Thus is should be apparent, that although there is a superficial similarity between the teachings of the Bell patent and the present invention, the similarity is only minor.

In view of the foregoing, the teachings of Bell do not lead to our invention.

A thermocompressor which may be utilized in practicing our invention may readily be obtained from AMETEK Corporation, Schutte and Koerting Division, Cornwells Heights, Pa. A typical thermocompressor is illustrated in FIG. 4.

In FIG. 4, thermocompressor 70 comprises a motive steam inlet 81, a nozzle 82, a suction steam inlet 83, a body or mixing area 84, and a diffuser and discharge section 86.

In practicing our invention in its simplest form, a fixed nozzle thermocompressor using the nozzle 82 in FIG. 4 is suitable. However, in a preferred embodiment of our invention we use an adjustable nozzle thermocompressor, which is illustrated in FIG. 4. The adjustment of nozzle 82 is achieved by turning knob 88 to cause needle valve 89 at the end of shaft 90 to partially obstruct the area of the inlet side of nozzle 82. With this added degree of freedom the degree of scavenging may be adjusted as desired to suit a particular mode of operation, or a different setting may be desirable for each different installation.

In operation, motive steam from the exhaust chamber 36 of the second stage tube bundle enters the motive steam inlet 81 and expands isentropically at nozzle 82 at which a high velocity jet is created and its static pressure is reduced. Suction steam at a relative low pressure as set forth hereinbefore is sucked into and entrained with the motive steam in the mixing area 84. In the diffuser the shape and length of the chamber are chosen to provide the desired velocity and pressure of the mixed steam, which is discharged from the discharge section to the input of the first stage reheater tube bundle. This steam is in addition to the steam supplied through valve 42 and is sufficient to substantially eliminate condensate subcooling and related instabilities in the first stage tube bundle 18.

While the invention has been set forth herein by means of specific descriptions and structure for purposes of a concise explanation, many modifications thereof may readily occur to those skilled in the art. For example, although the invention has been described herein with respect to a two-stage reheater and first stage scavenging steam has been recirculated by exhausted scavenging steam from the second stage reheater, it is equally applicable to apparatus having more than two reheater stages. Thus in a three-stage MSR, applying the same principles recirculation of scavenging flow would be accomplished in the two lower pressure bundles. Additionally, other tube bundle configurations, such as straight-through tubes bundles, known in the art, may be used in lieu of U tube bundles as described herein. Similarly, although we have described a high $\Delta P$ thermocompressor as the pumping means for recirculating scavenging steam in the first reheater tube bundle, other equivalent pumping means which meet the same functional requirements as a high $\Delta P$ thermocompressor may be used. Accordingly, we intend, by the appended claims, to cover all such modifications and changes as fall within the true spirit and scope of this disclosure.

What we claim is:

1. The method of substantially eliminating condensate subcooling within the tubes of a first stage reheater of a tube and shell reheater wherein shellside steam is reheated by passing in heat-exchange relationship with tubes of a first stage and a second stage reheater each containing saturated tubeside steam, said second stage reheater having an input of saturated steam which is at higher pressure than that of the saturated steam which is input to said first reheater, which method comprises; supplying exhausted scavenging steam from said first reheater to a low-pressure input of a high differential pressure pumping means: supplying exhausted scavenging steam from said second reheater to said high differential pressure pumping means; isentropically expanding said second stage exhausted scavenging steam in said pumping means and entraining the exhausted scavenging steam of said first stage reheater therein; and supplying the mixture of said reheater exhausts to the input header of said first stage reheater to substantially eliminate condensate subcooling in the tubes of said first stage tube bundle.

2. The method of claim 1 wherein the ratio of pressure of exhausted scavenging steam from said second reheater to the pressure of exhausted scavenging steam from said first reheater is at least 1.5:1.

3. In a moisture separator reheater having a vapor-tight shell, means for passing cool wet shellside steam therethrough, means within said shell for removing entrained moisture from said shellside steam, and first and second reheaters therein for raising the temperature of said dried shellside steam, said reheaters each being comprised of an inlet header, an outlet header, and a plurality of substantially parallel heat exchange tubes comprising a tube bundle connected therebetween and extending along said shell longitudinally and in heat-transfer relationship with said shellside steam and wherein said first reheater is supplied with saturated tubeside steam at a temperature and pressure less than the temperature and pressure at which saturated tubeside steam is supplied to said second reheater, the improvement comprising: means for providing an additional flow of steam to the inlet header of said first reheater sufficient to substantially eliminate condensate subcooling within said tubes, said means comprising a high differential pressure thermocompressor; means for supplying exhausted steam from said first reheater to a low-pressure input of said thermocompressor; means for supplying exhausted steam from said second reheater to a high-pressure input of said thermocompressor; and means for supplying the output of said thermocompressor to the inlet header of said first reheater.

4. The apparatus of claim 3 wherein said thermocompressor operates with a pressure ratio of high-pressure steam to low-pressure steam which is at least 1.5:1.

5. The apparatus of claim 3 wherein the steam taken from the exhaust header of said second reheater constitutes approximately 2 to 10 percent of the total inlet steam to the inlet header of said second stage reheater.

6. The apparatus of claim 3 wherein steam flow into the inlet ends of respective tubes in at least said second stage tube bundle is partially restricted to provide a greater flow of saturated steam into the tubes thereof which are subject to greater heat-transfer loading than other tubes of said bundle.

7. The apparatus of claim 3 wherein said individual heat-transfer tubes in said tube bundles are U tubes and are oriented in a substantially vertical plane and said inlet and outlet headers comprise separate chambers of a unitary header structure.

8. The apparatus of claim 3 wherein said individual heat-transfer tubes in said tube bundles are disposed in a substantially horizontal plane and said inlet and outlet headers comprise separate chambers of a unitary header structure.

9. A moisture separator reheater adapted to receive relatively wet, low-temperature inlet steam at an inlet thereof and for drying and reheating said inlet steam to produce dry hot outlet steam and comprising:
(a) pressure-tight shell;
(b) at least one steam inlet means located along one surface of said shell;
(c) at least one steam outlet means located along another surface of said shell;
(d) means adjacent said inlet for removing entrained moisture from inlet steam;
(e) a first tube bundle heat exchanger located longitudinally within said shell and disposed between said inlet and outlet and in heat-exchange relationship with steam passing between said inlet and outlet;
(f) a second tube bundle located longitudinally within said shell interposed between said first tube bundle and said steam outlet means and in heat-exchange relationship with steam passing between said inlet and outlet;
(g) a first header extending along a first end of said first stage tube bundle and receiving in pressure-sealed relationship the ends of said tubes comprising said first stage tube bundle and having therein a baffle separating said header into a plurality of chambers including an inlet one of which is open to one end of said tubes and an exhaust one of which is open to the remaining end of said tubes;
(h) a second header extending along a first end of said second tube bundle and receiving in pressure-sealing relationship the ends of said tubes comprising said second tube bundle and having therein a baffle separating said header into a plurality of chambers including an inlet chamber which is open to one end of each of said tubes and an exhaust chamber which is open to the other end of each of said tubes;
(i) means for directing relatively cool moist steam into said shell through said steam inlet in said shell to allow the same to pass in heat-exchange relationship with said first and said second tube bundles and emerge from said steam outlet on said other surface of said shell as hot dry steam;
(j) means for supplying a first flow of saturated high-pressure tubeside steam at a first high pressure and substantially above the temperature of shellside steam entering said shell inlet to the inlet chamber of said first header;
(k) means for supplying a second flow of saturated high-pressure tubeside steam at a second high pressure substantially above the pressure of said first flow of tubeside steam to the inlet chamber of said second header;
(l) pumping means operative to recirculate steam from the exhaust chamber of said first header to the inlet chamber thereof, adapted to receive motive steam from the exhaust chamber of said second header, to isentropically expand the same and to entrain steam from said first header exhaust chamber therein to provide a second steam input to the inlet chamber of said first header, both of said inputs to said first header input chamber being saturated or slightly superheated steam;
(m) said second steam input from said pumping means to said inlet chamber of said first header being of sufficient mass flow rate to substantially eliminate condensate subcooling within the tubes of said first tube bundle.

10. The apparatus of claim 1 wherein the steam taken from the exhaust chamber of the second header constitutes approximately 2 to 10 percent of the total inlet steam to the inlet chamber of said second stage tube bundle.

11. The apparatus of claim 9 wherein tubeside steam flow into certain of the tubes of at least said second stage tube bundle is restricted to allow greater saturated steam flow to enter the inlet ends of U tubes of at least said second stage tube bundle which are subjected to greater heat transfer loading than other tubes of said tube bundle.

12. The apparatus of claim 9 wherein said individual U tubes in said tube bundles are oriented in a substantially vertical plane and said baffles in said headers divide said headers into upper and lower chambers.

13. The apparatus of claim 9 wherein said individual U tubes in said tube bundles are disposed in a substantially horizontal plane and said baffles in said headers are disposed in a substantially vertical plane to separate said header into side-by-side sections.

14. The apparatus of claim 9 wherein said pumping means is a thermocompressor requiring a high differential in pressure between motive fluid and suction fluid for its operation having no moving parts and which operates to combine a high-pressure flow of motive steam with a relatively low-pressure flow of suction steam to produce an increased volume of intermediate pressure steam.

15. The apparatus of claim 14 wherein said thermocompressor operates with a pressure ratio of high-pressure fluid to low-pressure fluid of at least 1.5:1.

* * * * *